April 26, 1932.  J. EDGAR  1,855,511

MILLING CUTTER

Filed July 16, 1924

Inventor:
John Edgar,
By Chindall, Parkin & Carlson
Att'ys.

Patented Apr. 26, 1932

1,855,511

UNITED STATES PATENT OFFICE

JOHN EDGAR, OF ROCKFORD, ILLINOIS, ASSIGNOR TO BARBER-COLMAN COMPANY, OF ROCKFORD, ILLINOIS, A CORPORATION OF ILLINOIS

MILLING CUTTER

Application filed July 16, 1924. Serial No. 726,263.

The invention has particular reference to milling cutters of the inserted tooth type, and it has for its general object the provision of such a cutter wherein the inserted blades forming the teeth may be effectually secured about the cutter body in closely spaced relation, so as to render it possible to provide a large number of blades for the cutter.

More specifically stated, one object of the invention is to provide an improved means for clamping the blades in position in the cutter body, each such means serving to clamp two adjacent blades so that the body space occupied by the securing means is reduced to a minimum.

A further object is to provide a blade securing means including clamping members having wedge surfaces on their opposite sides adapted to coact with the opposed faces of two adjacent blades so that by tightening one securing means the clamping of two blades is effected.

In the accompanying drawings there is shown a rotary milling cutter having toothed blades inserted according to this invention. For the purpose of illustration, I have shown a milling cutter having helically arranged teeth suitable for milling gears.

Figure 4:
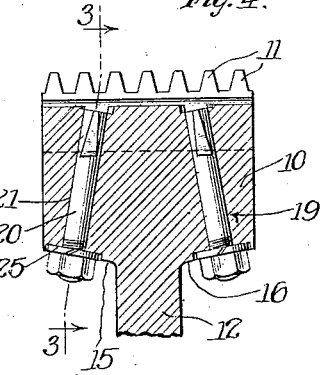
Fig. 4 is a sectional view along the line 4—4 of Fig. 3.

In the drawings the cutter body is shown as comprising a main annular portion 10 into which blades 11 are inserted. A web 12 is formed within the annular portion 10 of the body and carries a hub portion 13 which is adapted for mounting the cutter as by the provision of suitable bolt holes 14. The web 12, it will be observed from Fig. 4, is made of a thickness substantially less than the rim portion 10, so that annular shoulders 15 and 16 are provided on opposite sides of the body.

Figure 1:
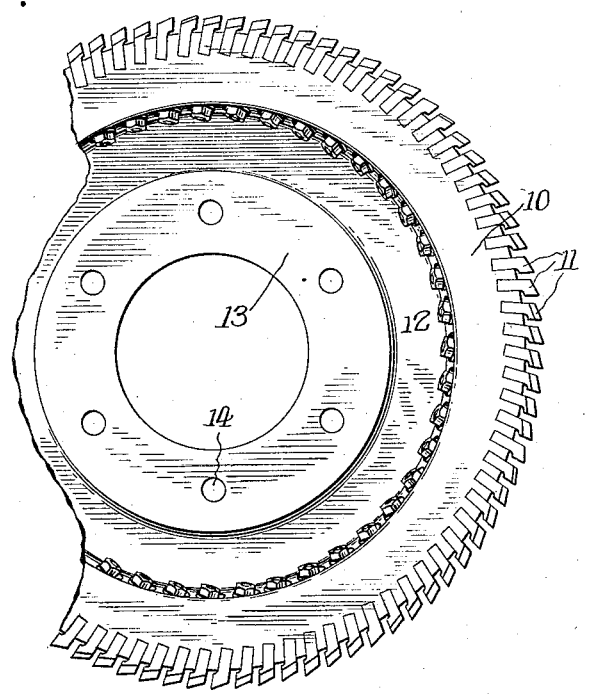
Figure 1 is a fragmentary side view of a large milling cutter.
Figure 2:
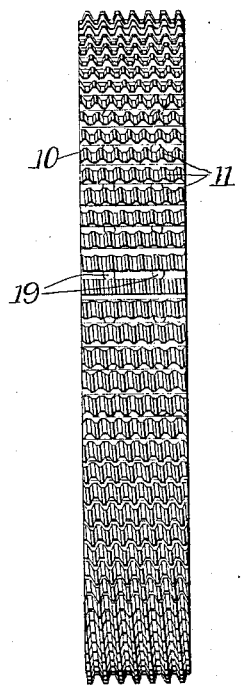
Fig. 2 is a view of the cutting face of the cutter in Fig. 1.
Figure 3:
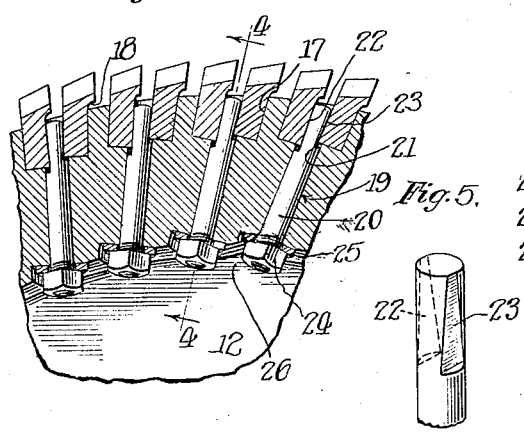
Fig. 3 is a cross sectional view on the line 3—3 of Fig. 4.
Figure 5:
Fig. 5 is a detailed view of the wedge structure employed.

To receive the blades 11 the cutter body is provided with slots 17 arranged transversely of its peripheral surface and in approximately equidistantly spaced relation. As shown clearly in Fig. 3, these slots are inclined slightly forwardly in the direction of rotation of the cutter, and their opposite side walls are preferably made parallel. Because of the similar location of each slot in the periphery of the cutter, no two slots are parallel, and further, because each slot has parallel faces, two adjacent slots have their adjacent faces converging towards the center of the cutter.

The blades 11 are made so as to fit snugly into the slots 17, but the latter are in the present instance made of a width somewhat less than the thickness of the blades at their outer ends. Accordingly, the portions of the blades which are to be inserted in the slots are made of reduced thickness by cutting away one side (herein the forward or leading side) as indicated at 18. This construction, it will be observed, reduces the space between the cutting teeth of adjacent blades.

I utilize the convergence of the slots above referred to in the means for securing the blades in position. Thus I provide clamping devices, designated generally by the numeral 19, interposed between each pair of adjacent blades, and shaped to engage with the blades with a wedging action so as to clamp them simultaneously in their respective slots. A bolt 20 provides the body of the wedging means which becomes effective on account of its particular relation to the cutter body and the blades in the slots. The bolt lies in a hole 21 located midway between two adjacent slots and lying in a plane having the same angular relation to the periphery as the median plane of each slot. The outer end of the bolt is shaped to provide opposed wedging surfaces 22 and 23 adapted to engage with the opposed surfaces of adjacent blades 11. The inner end of the bolt 20 is threaded and provided with a nut 24 and lock washer 25 seated in a countersunk recess 26 formed in the inner periphery of the rim portion 10. It will be seen that the tightening of the nut 24 of each clamping device 19 serves to secure two blades in their respective slots and to draw the blades down against the bottoms of the slots.

As shown in Fig. 4, I have by preference provided two clamping devices 19 for each pair of blades, one upon each side of the median plane of the cutter body; and I incline the devices from their inner ends toward said median plane of the cutter in order more equally to distribute the clamping action throughout the length of the blade.

The construction thus described lends itself readily to economical manufacture. At the same time accuracy in construction and an equal distribution of the clamping effect of each device upon the two blades held thereby is secured.

The manufacturing method preferably employed consists in first forming the holes 21 in equidistantly spaced relation and at the proper angle of lead or inclination. Bolts are then inserted in the holes and the body is suitably mounted in a milling machine for the formation of the slots 17. The nuts 24 on the bolts are adjusted so that when the bolts are held radially outwardly they occupy their inoperative positions.

The slots are now milled so as to intersect opposite sides of the bolt holes, and thus the opposite sides of the bolts inserted therein are simultaneously milled, resulting in the formation of the surfaces 22 and 23. Such surfaces are, therefore, coincident with the opposed sides of the adjacent slots, and because of the converging relation of the slots, the said surfaces 22 and 23 on the bolts together form in effect a wedging head on the outer end of each bolt. The tightening of the nuts 24 on the bolts produces, it will be observed, an equal clamping effect on both blades, and only a slightly longitudinal movement of the bolt is necessary to effect such clamping action.

While I have disclosed one particular structure of a milling cutter and a method by which the same may be produced, it is obvious that the invention may be embodied in other forms of milling cutters and that various changes may be made by those skilled in the art without departing from the spirit and scope of the invention as expressed in the appended claims.

I claim as my invention:

1. A milling cutter comprising, a body having an annular rim portion with pairs of slots formed transversely of the periphery of the body and holes passing through said rim portion approximately radially thereof and disposed midway between the slots of each pair, blades inserted in said slots, and clamping devices comprising bolts entered through said holes and each having on one end a wedging head adapted to coact with the opposed faces of each pair of blades and on its other end a tightening nut whereby to actuate the wedging head to clamp the blades.

2. A milling cutter comprising, a body having an annular rim on a web and having a plurality of separate transverse slots formed in the periphery of said rim and arranged in pairs, a single blade in each slot and projecting peripherally therefrom, and clamping means for each pair of blades comprising a wedge having faces engaging the opposed faces of each pair of blades, and means adjustable from the inside of said rim for actuating the wedge to clamp the blades.

3. A rotary cutter having, in combination, an annular body portion having a plurality of separate transverse slots in its peripheral face and a pair of spaced holes adjacent to and both intersecting adjacent slots, a single blade in each of said slots, a wedge in each hole, and means to draw said wedges independently of each other to clamp the blades in the slots.

4. A rotary cutter having, in combination, an annular body portion having a pair of transverse slots in its peripheral face, a single cutting blade in each of said slots, the body portion having also a hole therethrough of greater diameter than the distance between adjacent slots to open into each slot, a bolt extending through said hole having opposite segmental portions cut away at its outer end to form flat faces coinciding with the corresponding walls of the slots in one position of the bolt in the hole, and a nut on the inner end of said bolt to draw said bolt into the hole, said flat sides being adapted to clamp against the sides of the blades in the slots when drawn inwardly.

5. A rotary cutter having, in combination, an annular body portion having a plurality of sets of holes similarly located therein near the periphery thereof, the holes of each set being spaced transversely of the body portion, and having a plurality of transverse slots with adjacent slots intersecting one set of holes on opposite sides, a bolt in each of said holes having a wedge-shaped end, the faces of the wedge being coincident with the walls of the adjacent slots in one position of the bolt in its hole, a cutting blade fitting into each slot, and means to draw said bolts independently of each other to wedge the blades in the slots.

6. A rotary cutter having, in combination, an annular body portion, a central web supporting said body portion thereby forming shoulders on opposite sides of the web, the body portion having a plurality of pairs of holes extending therethrough from the periphery to said shoulders, and having also a plurality of slots in the periphery of the body portion transversely thereof, the arrangement being such that two adjacent slots intersect a pair of holes on opposite sides, a bolt in each hole having wedge faces at the outer end corresponding to the faces of the slots at the intersection with the hole, a blade in each slot, and a nut on the inner end of each bolt at the shoulder of the body portion to draw the wedge end of the bolt, whereby to clamp the blades in the slots.

7. A rotary cutter having, in combination, an annular body portion, a central web supporting said body portion, and forming with the body portion a pair of shoulders on opposite sides of the web, the body portion having a plurality of pairs of holes extending through from the periphery thereof to said shoulders, and having also a plurality of slots in the periphery of the body portion transversely thereof, each slot being disposed so as to intersect a pair of holes, a bolt in each hole, a blade in each slot, each bolt having its side adjacent the outer end thereof cut away to provide a wedging surface adapted to engage the blade in the slot, and a nut on the inner end of each bolt at the shoulder of the body portion to draw the bolt whereby to clamp the blade in the slot.

8. A rotary cutter having, in combination, an annular body portion, a central web supporting said body portion thereby forming shoulders on opposite sides of the web, said body portion having a plurality of sets of transversely spaced holes extending therethrough from said shoulders to the periphery, and having a plurality of pairs of transverse slots respectively intersecting said sets of holes on opposite sides, a cutting blade fitting in each slot, a bolt in each of said holes having a wedge-shaped end, and a nut on the inner end of each bolt bearing against one of said shoulders for drawing the bolt inwardly to wedge the blades in the slots, the holes of each set being convergent toward the periphery of the body portion.

9. A milling cutter having blades inserted in slots in the periphery of the cutter, there being a single blade in each slot, wedge members movable in holes connecting each pair of adjacent slots, the blades in said slots and the wedge member therebetween being interrelated as wedges to each other whereby two blades and said wedge member are wedged between the outer faces of each pair of slots, each wedge member being formed on the outer end of a bolt, and means on the inner end of each bolt for adjusting said bolt.

In testimony whereof, I have hereunto affixed my signature.

JOHN EDGAR.

CERTIFICATE OF CORRECTION.

Patent No. 1,855,511.                                                                     April 26, 1932.

JOHN EDGAR.

It is hereby certified that error appears in the printed specification of the above numbered patent requiring correction as follows: Page 3, line 40, beginning with the number and words "9. A milling" strike out all to and including "said bolt." in line 51, comprising claim 9; and that the said Letters Patent should be read with this correction therein that the same may conform to the record of the case in the Patent Office.

Signed and sealed this 12th day of July, A. D. 1932.

M. J. Moore,
(Seal)                                             Acting Commissioner of Patents.